United States Patent
Lakshman et al.

(10) Patent No.: US 10,908,841 B2
(45) Date of Patent: Feb. 2, 2021

(54) INCREASING THROUGHPUT OF NON-VOLATILE MEMORY EXPRESS OVER FABRIC (NVMEOF) VIA PERIPHERAL COMPONENT INTERCONNECT EXPRESS (PCIE) INTERFACE

(71) Applicant: Cisco Technology, Inc., San Jose, CA (US)

(72) Inventors: Ravikiran Kaidala Lakshman, San Jose, CA (US); Deepak Srinivas Mayya, Fremont, CA (US); Tanjore K. Suresh, Fremont, CA (US); David S. Walker, San Jose, CA (US); Sagar Borikar, San Jose, CA (US); Shrikant Vaidya, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 16/139,264

(22) Filed: Sep. 24, 2018

(65) Prior Publication Data
US 2020/0097212 A1    Mar. 26, 2020

(51) Int. Cl.
G06F 3/06 (2006.01)
G06F 15/173 (2006.01)
H04L 29/06 (2006.01)

(52) U.S. Cl.
CPC .......... *G06F 3/0659* (2013.01); *G06F 3/0688* (2013.01); *G06F 15/173* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 5,630,075 A | * | 5/1997 | Joshi | G06F 12/0804 711/100 |
| 5,809,228 A | * | 9/1998 | Langendorf | G06F 12/0215 365/189.05 |
| 6,003,089 A | * | 12/1999 | Shaffer | H04L 47/36 370/232 |
| 6,604,149 B1 | * | 8/2003 | Deo | H04L 69/04 709/236 |

(Continued)

OTHER PUBLICATIONS

Marks, Kevin, "An nvm express tutorial." Flash Memory Summit (2013) (Year: 2013).*

*Primary Examiner* — William E. Baughman
(74) *Attorney, Agent, or Firm* — Edell, Shapiro & Finnan, LLC

(57) ABSTRACT

Presented herein are methodologies for increasing effective throughput on a network. A method includes receiving a command request via a communication bus, the command request including a command ID, determining, based on the command ID, whether data in the command request is to be joined with data from other command requests having the same command ID, when it is determined, based on the command ID, that the data in the command request is to be joined with other data from other command requests having the same command ID, writing the data to a selected buffer in which the other data is already stored, and causing the data and the other data in the buffer to be sent as a payload of a single packet across a communications fabric.

16 Claims, 11 Drawing Sheets

(56) References Cited

U.S. PATENT DOCUMENTS

| | | | |
|---|---|---|---|
| 8,468,319 B1* | 6/2013 | Satran | G06F 3/0689 |
| | | | 711/111 |
| 8,495,301 B1* | 7/2013 | Alexander | G06F 13/28 |
| | | | 711/118 |
| 8,615,614 B2* | 12/2013 | Xu | G06F 13/28 |
| | | | 710/26 |
| 9,747,249 B2 | 8/2017 | Cherian et al. | |
| 2005/0038941 A1* | 2/2005 | Chadalapaka | H04L 67/00 |
| | | | 710/52 |
| 2005/0165985 A1* | 7/2005 | Vangal | G06F 13/4027 |
| | | | 710/107 |
| 2013/0066977 A1* | 3/2013 | Katti | H04L 51/30 |
| | | | 709/206 |
| 2015/0127882 A1* | 5/2015 | Carlson | G06F 12/0246 |
| | | | 711/103 |
| 2017/0286363 A1 | 10/2017 | Joshua et al. | |
| 2019/0026033 A1* | 1/2019 | Simionescu | G06F 12/0868 |

* cited by examiner

MIDT: COMMAND ID TABLE

| \multicolumn{3}{l}{INDEXED BY COMMAND ID FROM CReq ADDR. CAN BE COMBINED WITH OSIT TABLE - 4k ENTRIES MAINTAINED BY HARDWARE} |
|---|---|---|
| FIELD | SIZE | DESCRIPTION |
| IN PROGRESS | 1 | INDICATES COALESCING OPERATION CURRENTLY IN PROGRESS. |
| BID | 4 | IN PROGRESS==0: N/A<br>IN PROGRESS==1: {BID[3:0]} -> BUFFER ID. INDICATES WHICH BUFFER IS BEING USED TO COALESCE. |
| VCID | 8 | IN PROGRESS==0: N/A<br>IN PROGRESS==1: VIRTUAL COMMAND ID...SENT AS PART OF PACKET HEADER. MAINTAINED THROUGH COALESCING OPERATION AND, IN THE CASE OF READ COALESCING, THE READ RESPONSE. |

FIG.5

OSIT: OPTIMAL SIZE INFO TABLE

| INDEXED BY COMMAND ID - 4k ENTRIES                                     |      |                          |
|------------------------------------------------------------------------|------|--------------------------|
| MAINTAINED BY SOFTWARE, ACCESSES BY HARDWARE FOR JOIN CANDIDATES        |      |                          |
| FIELD            | SIZE | DESCRIPTION               |
| LAST ADDRESS     | 64   | LAST ADDRESS              |
| VALID            | 1    | VALID BIT                 |
| LAST OPTIMAL SIZE | 14  | SIZE TO COALESCE          |
| VALID            | 1    | VALID BIT                 |
| #ZEROS           | 5    | START OF PAGE INDICATION  |
| OPTIMAL SIZE     | 14   | SIZE TO COALESCE          |
| TOTAL            | 99   |                           |

FIG.6

SJIT: SPLIT / JOIN IN PROGRESS TABLE

| INDEXED BY BID (FIRST HALF, FOR WRITES) OR VCID (SECOND HALF, FOR READS) | | |
|---|---|---|
| FIELD | SIZE | DESCRIPTION |
| VALID | 1 | |
| READ / WRITE | 1 | READ OR WRITE IN PROGRESS. MUST MATCH CURRENT TLP. |
| BYTES EXPECTED | 14 | TOTAL SIZE OF COALESCED PACKET. SEND AS PART OF PACKET HEADER. |
| BYTES RECEIVED | 14 | BYTES COALESCED SO FAR. |
| EXPECTED ADDRESS | 64 | NEXT EXPECTED ADDRESS. NEXT CREQ FOR THIS COMMAND ID MUST MATCH THIS ADDRESS. |
| VCID / BID | 4 | VCID (READS) OR BUFFER (WRITES) USED FOR THIS COALESCING OPERATION. |
| TIMER STATE | 2 | 00- NOT ENABLED<br>01-ENABLED<br>10- RESERVED<br>11-EXPIRED |

FIG.7

CIDT: CReq ID TABLE

| INDEXED BY CID (.). MAINTAINED BY HARDWARE | | |
|---|---|---|
| FIELD | SIZE | DESCRIPTION |
| WAITING | 1 | WAITING FOR RESPONSE |
| Creq SIZE | 8 | SIZE OF REQUEST. 0 = 256 BYTES |
| TIMER EXPIRED | 1 | TIMER HAS EXPIRED |

FIG.8

VCIDT: VIRTUAL CReq ID TABLE

| INDEXED BY VCID (.). MAINTAINED BY HARDWARE | | |
|---|---|---|
| FIELD | SIZE | DESCRIPTION |
| STATUS | 2 | 00 - NOT IN USE<br>01 - COALESCING READ OPERATION<br>10 - RESERVED<br>11 - WAITING FOR RESPONSE |
| COMMANDID | 12 | USED FOR ERROR REPORTING |
| NUM CIDs | 6 | NUMBER OF CIDs VALID |
| TIMER STATE | 2 | 00 - TIMER NOT ENABLED<br>01 - TIMER EBABLED<br>10 - RESERVED<br>11 - TIMER EXPIRED |
| CID[0] | 8 | ID OF ORIG CReq 0 |
| CID[1] | 8 | ID OF ORIG CReq 1 |
| ⋮ | ⋮ | ⋮ |
| CID[35] | 8 | ID OF ORIG CReq 35 |

INCREASING THROUGHPUT OF NON-VOLATILE MEMORY EXPRESS OVER FABRIC (NVMEOF) VIA PERIPHERAL COMPONENT INTERCONNECT EXPRESS (PCIE) INTERFACE

TECHNICAL FIELD

The present disclosure relates to processing data read or write requests between a host and a target over a network.

BACKGROUND

The maximum payload size (MaxPayloadSize) of a Peripheral Component Interconnect Express (PCIe) implementation may be on the order of 64-4096 bytes. PCIe credit buffers are designed to support PCIe for a given MaxPayloadSize. This enables a given implementation to receive payload up to a maximum of the MaxPayloadSize in each such transaction it receives from other peer device/(s) in the system.

The bigger the MaxPayloadSize programmed for use, the more buffering space is required to maintain credits that can be advertised to achieve a desired performance expectation. The number of credit buffers available in an implementation and the MaxPayloadSize are two parameters that can affect an application specific integrated circuit's (ASIC's) die size and cost. Also, such increase in credit buffers may not give significant performance gains when used under typical networking or storage applications. This suggests that an implementation cannot rely on one MaxPayloadSize (or "chunk" size) value to achieve the best performance in all applications.

An application that handles raw payload coming in on PCIe, may not operate efficiently if the data is to be sent on, e.g., an Ethernet fabric for onward processing. The network processors which allow such bridging of PCIe transactions to an Ethernet fabric are becoming more popular by allowing the transactions to be bridged from PCIe directly to an Ethernet pipeline without staging in a memory subsystem. To date, PCIe end points have relied on delivering transactions to such a memory subsystem and back. This type of PCIe to network pipeline bridging is becoming of more interest to handle newer applications such as Non-Volatile Memory Express (NVMe) Over Fabric (NVMEoF) and other applications to bridge across Ethernet fabric using remote direct memory access (RDMA), Fiber Channel over Ethernet or TCP/IP, among other possible protocols. The Ethernet fabric's maximum payload size can vary from 1.5K to 9K bytes, and different application/protocols implement different sizes within this range to operate efficiently. However, this mismatch between the MaxPayloadSize on PCIe and the Ethernet fabric's maximum payload size, makes bridging applications like NVMeOF, when not implemented correctly, use the Ethernet fabric non-optimally. Such inefficiency is more pronounced when the application handles raw payload from PCIe without staging the data in a memory subsystem.

BRIEF DESCRIPTION OF THE DRAWINGS

FIG. 5 is a Command ID table used by the split/join logic in accordance with an example embodiment.

FIG. 6 is an optimal size information table used by the split/join logic in accordance with an example embodiment.

FIG. 7 is a split/join in progress table used by the split/join logic in accordance with an example embodiment.

FIG. 8 is a command request ID table used by the split/join logic in accordance with an example embodiment.

FIG. 9 is a virtual command request ID table used by the split/join logic in accordance with an example embodiment.

DESCRIPTION OF EXAMPLE EMBODIMENTS

Overview

Presented herein are techniques for increasing effective throughput on a network. A method includes receiving a command request via a communication bus, the command request including a command identifier (ID), determining, based on the command ID, whether data in the command request is to be joined with data from other command requests having the same command ID, when it is determined, based on the command ID enabled address, that the data in the command request is to be joined with other data from other command requests having the same command ID, writing the data to a selected buffer in which the other data is already stored, and causing the data and the other data in the buffer to be sent as a payload of a single packet across a communications fabric A device or apparatus is also described. The device may include an interface unit configured to enable network communications; a memory; and one or more processors coupled to the interface unit and the memory, and configured to: receive a command request via a communication bus, the command request including a command identifier (ID), determine, based on the command ID, whether data in the command request is to be joined with data from other command requests having the same command ID, when it is determined, based on the command ID, that the data in the command request is to be joined with other data from other command requests having the same command ID, write the data to a selected buffer in which the other data is already stored, and cause the data and the other data in the buffer to be sent as a payload of a single packet across a communications fabric.

Example Embodiments

Figure 1:
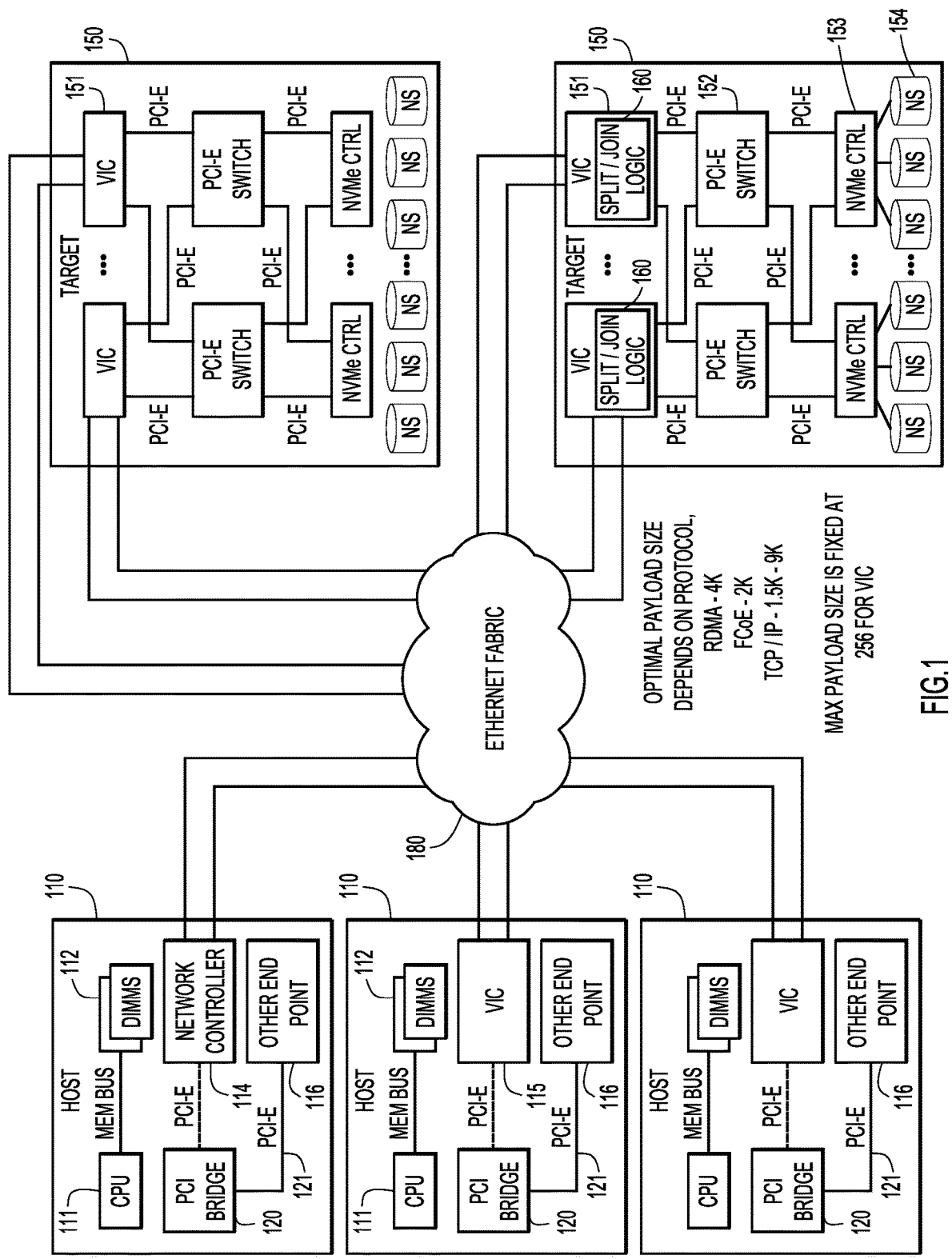
FIG. 1 depicts a network of devices interconnected via an Ethernet fabric, wherein at least one of the devices includes a virtual interface card (VIC) that is configured to operate split/join logic in accordance with an example embodiment.

FIG. 1 depicts a network of devices interconnected via an Ethernet fabric, wherein at least one of the devices includes a virtual interface card (VIC) that is configured to operate split/join logic in accordance with an example embodiment. More specifically, multiple hosts 110 are in potential or actual communication with one or more target devices 150 via a fabric, such as an Ethernet fabric 180. Each host 110, e.g., a remote host, might include a central processing unit (CPU) 111, which is operably connected to memory in the form of, e.g., dual inline memory modules (DIMMS) 112 via, e.g., a memory bus, and which is also operably connected to a network controller 114 or virtual interface card (VIC) 115 or other endpoint 116 via a PCIe bridge 120 and corresponding PCIe bus 121. As shown, the network controller 114 and VICs 115 are in communication with fabric 180. Target devices 150 may provide mass storage capability through, e.g., an NVMe infrastructure. In this regard, a target 150 may include one or more VICs 151, one or more PCIe switches 152, and/or one or more NVMe controllers 153, which are configured to read from, and write to, non-volatile storage (NS) devices 154.

As noted, an issue can arise in that connectivity via a PCIe bus or infrastructure might be limited to packet payloads of, e.g., 256 bytes, whereas connectivity via fabric 180 may support packet payloads anywhere from 1.5 k to 9 k bytes. For example, RDMA supports 4 k byte payloads, FCoE supports 2 k byte payloads, and TCP/IP supports 1.5 k to 9 k byte payloads. Accordingly, where a VIC 151 on a target 150 sends data to a remote host 110, it might do so in, e.g., 256 byte payload chunks, leaving the individual fabric packet payloads mostly empty. This is an inefficient use of the fabric, and in the instant case is caused by a payload size mismatch between what the fabric 180 can support and what the PCIe infrastructure on a target can support.

To address the foregoing issue, split/join logic 160, which is deployed via, e.g., an ASIC (implemented as VIC 151), is configured to join, aggregate or coalesce PCIe packet/payloads headed towards the fabric 180, or split fabric-received packet payloads for PCIe consumption on the target side. Details of a methodology or mechanism for achieving collated, joined or coalesced packet payloads and for achieving split payloads is described below in detail.

At a high level, and in the context of NVMe, when a host 110 sends a NVMe read command towards a target 150, that host read command indicates where it expects the data to be placed. Such a request will be processed by target 150, and turned into a write PCIe Request/command on the target side, i.e., the target is configured to write the data requested to the appropriate host address that host 110 provided. Likewise, when a host 110 sends a disk write command towards a target 150, that host NVMe write command will be processed by target 150, and turned into a PCIe read request/command on the target side, i.e., the target is configured to read indicated data from the host 110 memory addresses for storage on the target.

Without the embodiments described herein each PCIe transaction layer packet (TLP) is converted to an appropriate Ethernet protocol of choice for an implementation. This is inefficient since the maximum payload size for a PCIe TLP may be only 256 bytes. The embodiments described herein add coalescing logic to make more efficient use of the network bandwidth by combining several command requests (CReqs) into a single packet.

Figure 2:
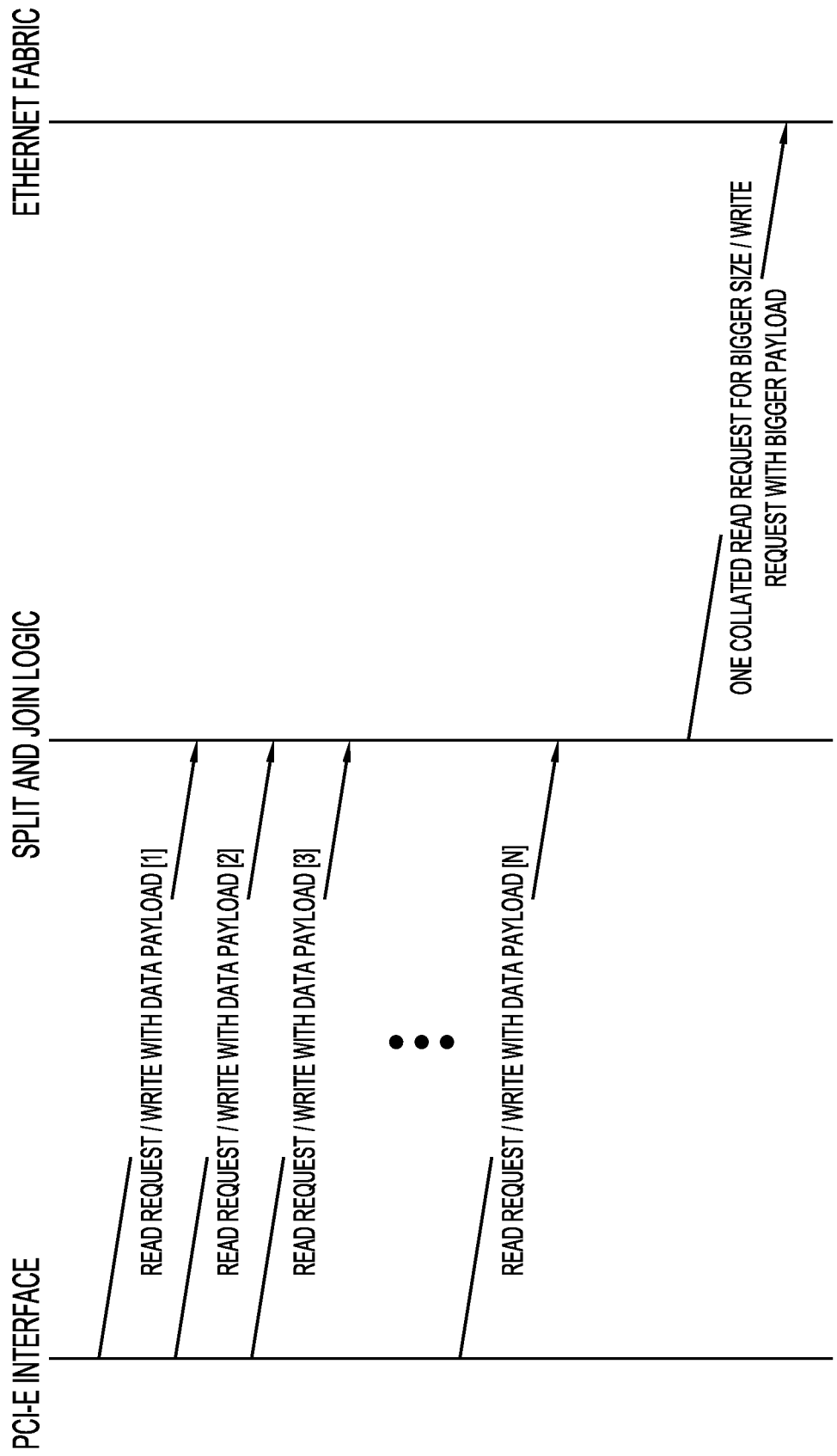
FIG. 2 depicts a high level depiction of read/write collation or joining in accordance with an example embodiment.
Figure 3:
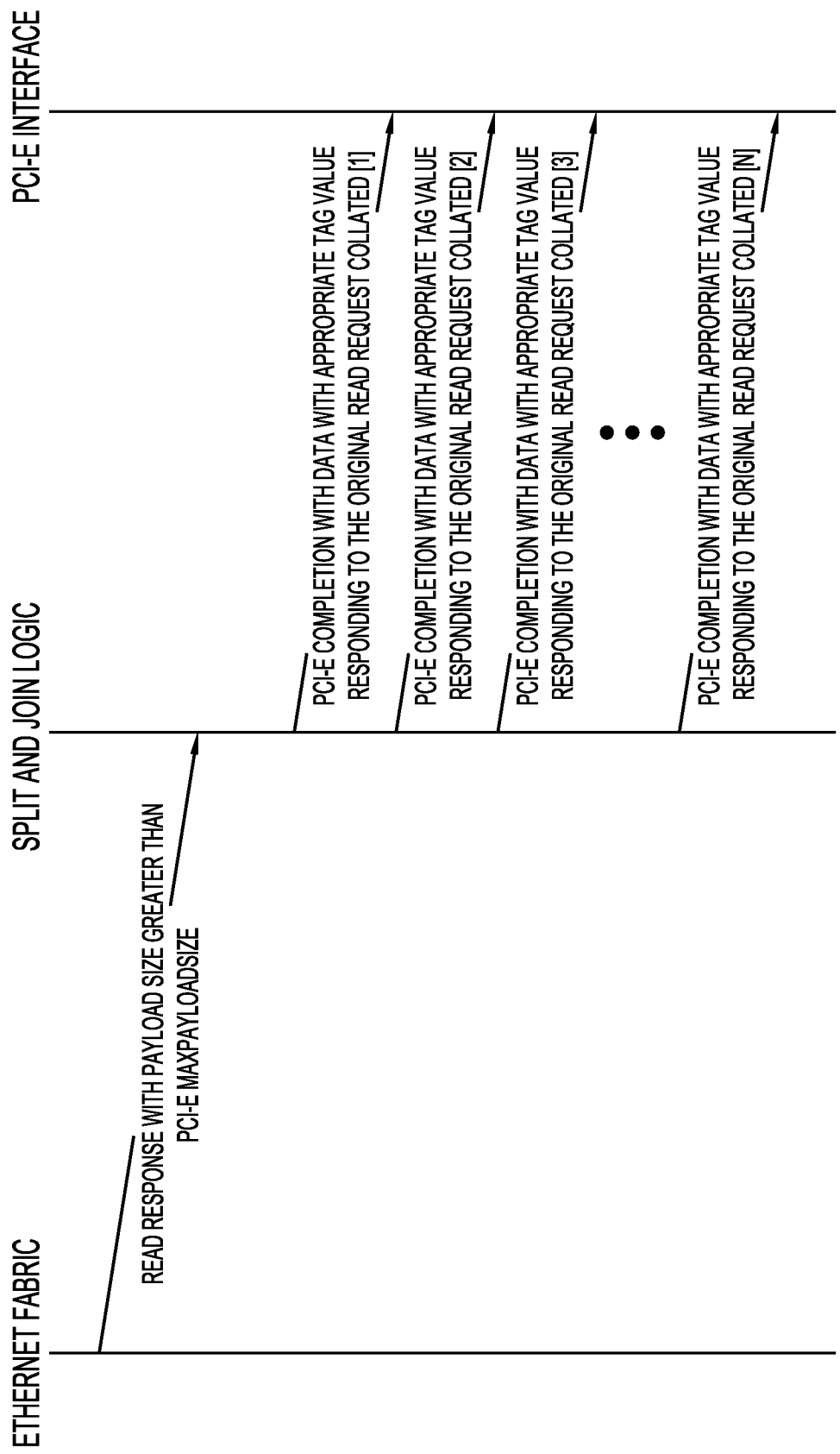
FIG. 3 depicts a high level depiction of read response splitting in accordance with an example embodiment.

The logic 160 coalesces several commands into a single packet before sending the same to an inline network packet processing element (not shown) for encapsulation/conversion to the appropriate Ethernet protocol to go out over fabric 180. For PCIe write commands (host NVMe reads), the write data is coalesced into a larger packet. The length of the larger packets is the sum of the lengths of all of the coalesced CReq lengths used to make the large packet. For PCIe read commands (host NVMe writes), several CReq read requests are sent as a single larger read request, again with a summary length and a starting address from where to fetch the data. When the single large read response (i.e., data) is received, it is split into smaller individual responses, one for each of the original CReq commands that was used to create the larger read request. The above high level description is depicted in FIGS. 2 and 3, in which FIG. 2 depicts a high level depiction of read/write collation or joining in accordance with an example embodiment, and FIG. 3 depicts a high level depiction of read response splitting in accordance with an example embodiment.

Figure 4:
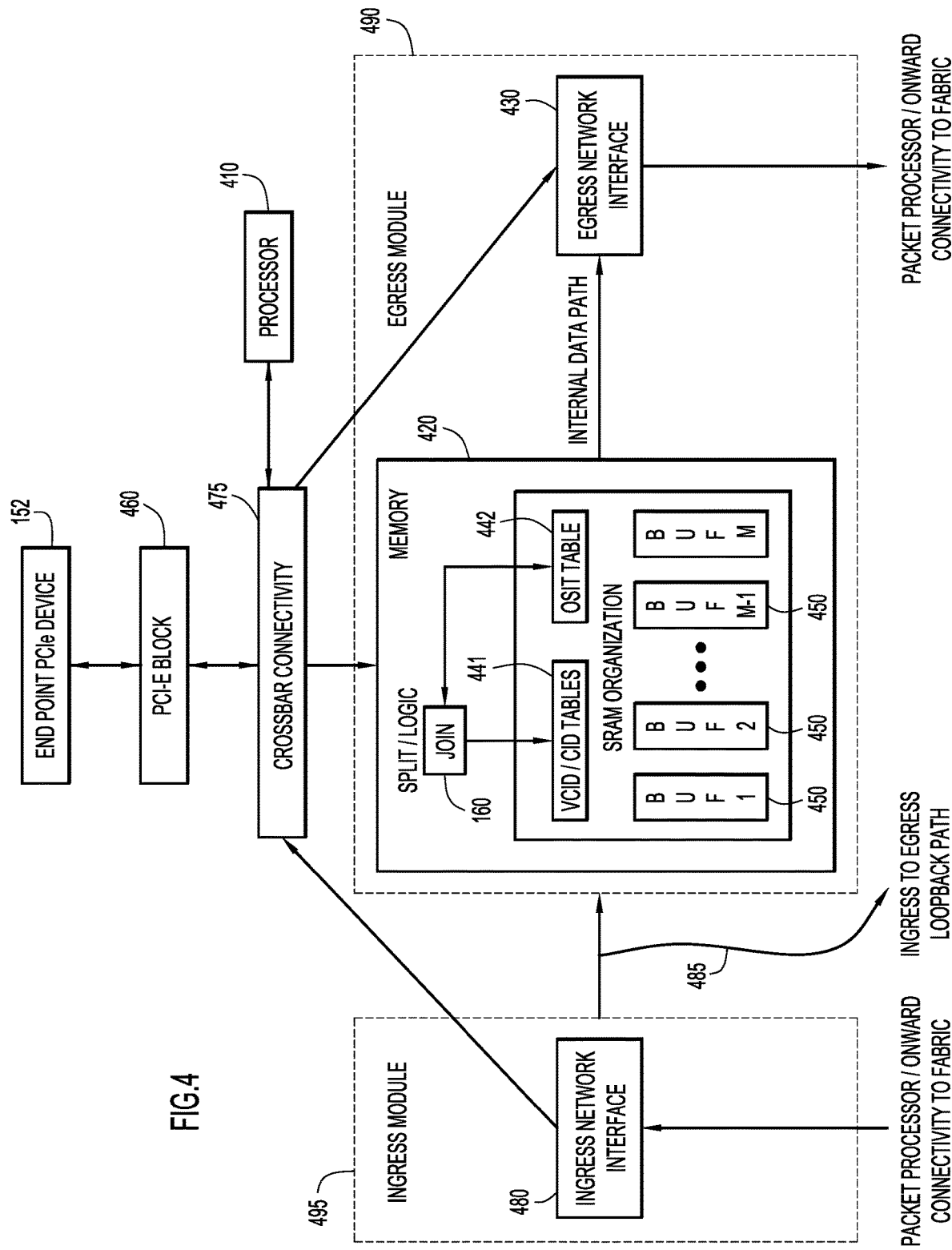
FIG. 4 shows a block diagram of elements in an ASIC that hosts the split/join logic and connectivity of the ASIC to external elements in accordance with an example embodiment.

FIG. 4 shows a block diagram of elements in an ASIC that hosts the split/join logic and connectivity of the ASIC to external elements in accordance with an example embodiment. As shown, an ASIC might include a processor 410, memory 420 and an interfaces 430, 480, e.g., an interface to a processing element/packet processor, or an interface directly to fabric 180. Memory 420 may be configured to store split/join logic 160 along with supporting tables 441, 442 (described below), and multiple buffers, the number of which will correspond to the number of individual command ids that can be handled simultaneously. In one embodiment, 16 buffers are provided, such that up to 16 different command requests can be split or joined at the same time. Crossbar connectivity 475 enables connectivity among, e.g., interface 480, processor 410, PCIe block 460 and memory 420. PCIe block 460 is responsible for interfacing with end point PCIe device (switch) 152. It is noted that split/join logic 160 could also be implemented as part of hardware 490.

Split/join logic 160 is supported by five tables including a Command identifier (ID) table (MIDT) (FIG. 5), Optimal Size information table (OSIT) (FIG. 6), Split/Join In Progress table (SJIT) (FIG. 7), command request ID (CID) Table (FIG. 8) and virtual command request ID (VCID) table (FIG. 9). The Command ID table (FIG. 5), OSIT table (FIG. 6) and In Progress table (FIG. 7) are used for both read and write command coalescing, while the CID table (FIG. 8) and VCID table (FIG. 9) are used only for read joining and response splitting.

Details of how joining (or coalescing) and splitting are provided below and later with reference to FIGS. 10 and 11.

There are two sets of memory used in split/join operations. For write joining, packet coalescing happens in a buffer 450 assigned to a given the command id. The VCID used for write command packets is not important and, as such, may be set to a fixed number, e.g., in the instant example to 0x10 for write packets.

Read joining may be implemented as a context of registers that eventually gets sent as a small packet with a unique VCID (0x0-0xF). Read response splitting involves receiving the response packet into a buffer and, using the information saved in the VCID and CID tables, splitting the response up into individual responses corresponding to the CReq commands used to create the joined read command.

In one implementation, coalesced read commands use VCIDs 0-15. One of these 16 VCIDs is allocated to a command when a read coalescing operation is started. That VCID is held by that command until the "coalesced" read response is received and split into the local responses. After that, the VCID is returned to the pool and may be used by another read coalescing operation.

In one implementation, the split/join logic 160 can coalesce up to 16×4 k (or 8×8 k) read and 16×4 k (or 8×8 k) write commands at once.

Commands may be sent un-coalesced across the fabric 180 for the following reasons:
 1. The coalescing functionality is disabled; or
 2. There are insufficient resources, e.g., buffer resources, or VCIDs to allocate to support coalescing.

Write Coalescing—Join

In one implementation, all writes are posted writes. In order to use a buffer 450 as a staging area for coalesced packets, header information for each packet is written to the buffer 450 at the start of each coalescing operation.

Once a write command is received and the split/join logic 160 determines it is the beginning or the continuation of a coalescing operation, the data is written to one of the 8 or 16 buffers and the SJIT, MIDT tables are updated accordingly. Writes for a given command id continue to be received, verified, and written to a selected buffer. When the last write is received, the final packet is written to the buffer and the buffer becomes eligible for sending. When the buffer is selected, the entire coalesced packet is sent, via interface 430, to a packet processor for further processing to be sent over the fabric 180.

Read Coalescing

Read coalescing is simpler than write coalescing. A single read command with a starting address and size is sent to a packet processor for further processing after all of the read commands have been received. The single read command is then sent over the fabric 180.

Once a read command is received, the CID table is updated with the local CReq ID and size regardless of whether the given read is part of a coalescing operation or not. If it is determined that the CReq command is the beginning or a continuation of a read coalescing operation, then the CID of the current Creq command is written into the next available slot in the corresponding VCID table entry. The MIDT and SJIT tables are also updated.

Reads for this command id continue to be received, verified and the CID/VCID/SJIT tables continue to be updated. When the last read command is received the "packet" is sent to the inline packet processor for further processing.

The info header associated with split/join packets is prepended to both coalesced read and write packets.

Figure 10:
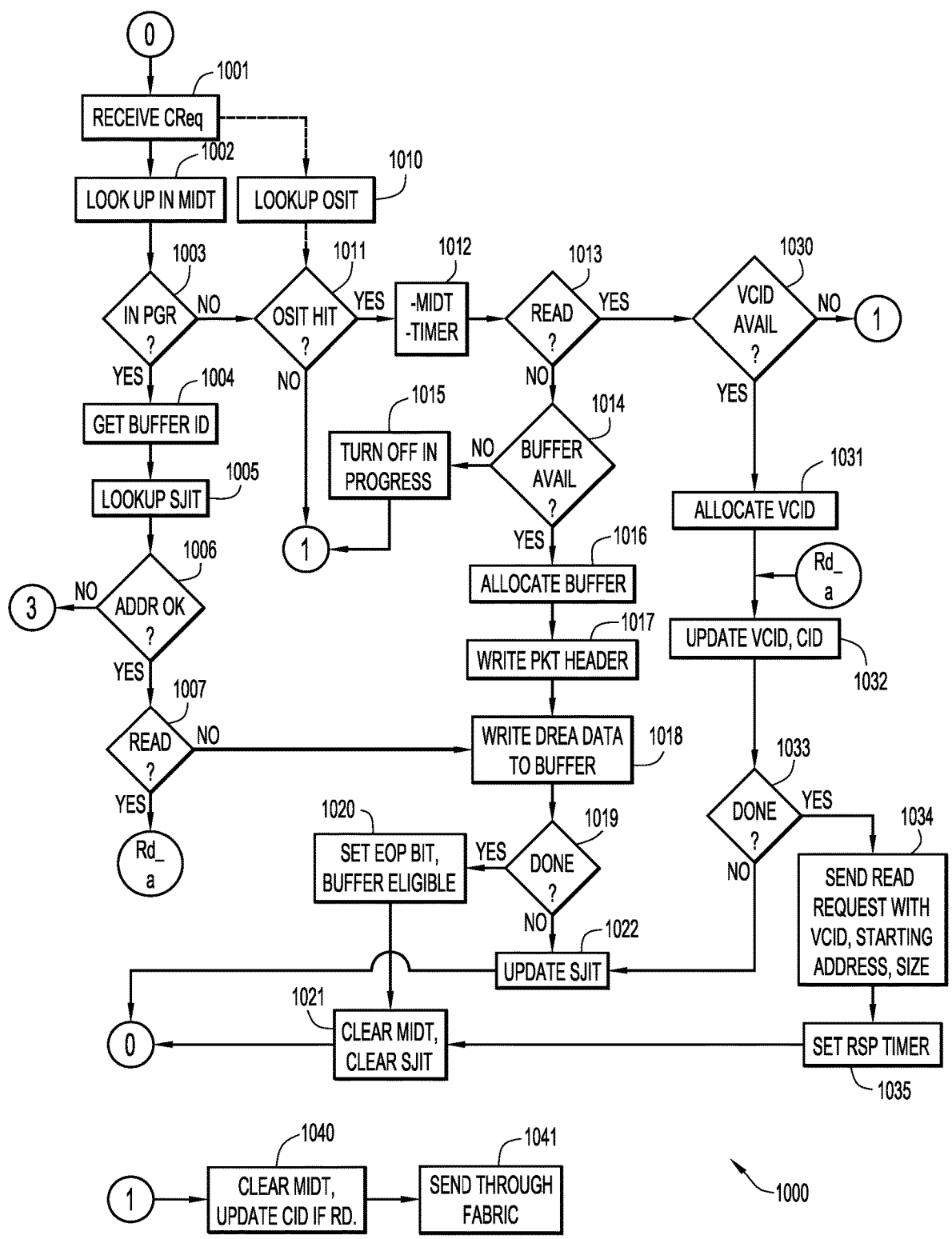
FIG. 10 is a flow chart depicting a series of operations for performing split/join operations in accordance with an example embodiment.

FIG. 10 is a flow chart depicting a series of operations 1000 for performing split/join operations in accordance with an example embodiment. Operations 1000 may be implemented by an ASIC/VIC 151, and more particularly by split/join logic 160.

At 1001 a command request (creq) is received at VIC 151. The creq may be received over a dedicated bus that not only carries command information, but may also carry data and response requests (discussed later herein).

The creq command includes, among other things, a type (read (which is a host NVMe write) or write (which is a host NVMe read)) indication, a size, a creq id, and a creq address. In an implementation, the creq address field is augmented to further include an indication of a new command id that is used to trigger the operation of logic 160.

More specifically, assume a NVMe Read or Write I/O command received from the initiator (host 110) has the following scatter-gather list (SGL) entries as described in the table below. Note that the first entry does not indicate the start address to be page aligned. This example has been chosen to indicate that such SGL information can be received from initiators, yet the instant methodology would still function properly. The remaining entries indicate the starting address to be page aligned assuming the page size to be 4K for this example. Also, the NVMe sector size is 4K and the NVMe command allows the minimal granularity to read or write a NVMe disk, is a sector size worth.

| SGL Entry Number | Address | Size in Bytes |
| --- | --- | --- |
| 1 | 0xff840C00 | 0x400 |
| 2 | 0xff841000 | 0x1000 |
| 3 | 0xff842000 | 0x1000 |
| 4 | 0xff843000 | 0x1000 |
| 5 | 0xff844000 | 0x1000 |
| 6 | 0xff845000 | 0x1000 |
| 7 | 0xff846000 | 0x1000 |

As soon as such a command enters the NVMe subsystem implementation (i.e., is detected by, e.g., processor 410, the logic allocates a new Command ID and maintains the mapping between the allocation and the original command ID provided by the implementation. In this example, assume that 0x345 is allocated as the command ID for this command. Then the massaged SGL information, before posting the send queue (SQ) entry to the end point controller, will look like what is represented in the following table.

| Serial Number | Address | Size in Bytes |
| --- | --- | --- |
| 1 | 0x34500000ff840C00 | 0x400 |
| 2 | 0x34500000ff841000 | 0x1000 |
| 3 | 0x34500000ff842000 | 0x1000 |
| 4 | 0x34500000ff843000 | 0x1000 |
| 5 | 0x34500000ff844000 | 0x1000 |
| 6 | 0x34500000ff845000 | 0x1000 |
| 7 | 0x34500000ff846000 | 0x1000 |

The allocated command ID, as shown, has been stuffed into the address field in bits not typically used as part of an address indication. When a creq with such a command ID embedded in the creq address field is received, logic 160 is configured to perform the appropriate joining or splitting to achieve improved throughput across the fabric 180, even though a local PCIe implementation operates in smaller chunk sizes.

At 1002 the logic looks up the I/O context (i.e., the allocated and embedded 0x345) in the MIDT (or I/O context table) (FIG. 5), indexed by allocated I/O context. The MIDT table indicates whether the given I/O context is in progress (i.e., a coalescing operation is currently in progress for the I/O context), and, if so, provides the buffer ID for that in progress write coalescing operation, or a VCID for an in progress read coalescing operation.

At 1003 logic 160 determines, from the MIDT if the Command ID is in progress. If the Command ID is already in progress, then logic 160 proceeds to 1004 where the buffer ID is obtained.

At 1005 the Command ID is looked up in the SJIT (FIG. 6), to confirm the correct data, in the appropriate order, is to be loaded into buffer. This is confirmed by checking the SJIT for the total size of the coalesced packet (which is sent as part of the packet or information header). The number of bytes coalesced so far in a given in-progress join is checked, and the next expected address (e.g., the last address, plus 256 bytes) is compared with the address associated with the incoming packet.

At 1006, if there is something wrong with the expected address, an error can occur, causing the join function to fail. If the address is acceptable, then at 1007 it is determined if the current command is a read (host NVMe write) operation. If the Command ID is for a read command then logic 160 proceeds to 1032, discussed later herein.

If, at 1007, the current operation is not a read operation, i.e., the current operation is a write operation (or host NVMe read operation where the host is seeking data from the target 150), then logic 160 proceeds to operation 1018 at which data that was provided along with the creq is written to the buffer indicated by the buffer ID (BID) obtained at operation 1004.

At 1019 it is determined whether the write coalescing is complete by, e.g., determining whether the most recently written 256 bytes is the last chunk of, e.g., 16 chunks (to make a 4 k byte fabric payload). If the current operation is the last chunk of data to be written, then at 1020 an end of packet bit is set, and the buffer is made available for further processing to send the data over the fabric 180 via VIC 151. At 1021 the MIDT and SJIT tables (both indexed by the command ID of the current operation) are cleared such that the buffer can be used for a different subsequent Command ID. The process then returns to operation 1001.

The foregoing described an in-progress write. The following describes a Command ID for a new (i.e., not in-progress) write command. In this case, at 1003 it is determined that the Command ID is not in progress, based on information in the MIDT table. As a result, logic 160 proceeds to 1011 where it is determined from the OSIT (FIG. 6), and operation 1010, whether the address indicates a start of a page. This can be determined by, for example, analyzing the number of lower address bits that are zeros, indicating a start of page. If the address is not at the beginning of a page, the logic 160 proceeds to 1040 at which the MIDT is cleared and the CID is updated if the operation is a read, and then to 1041 where the data received is not joined or coalesced, but instead is sent directly over the fabric. In this case, a host might have requested millions of bytes (which would be provided in, e.g., 4 k payloads), and the system may need to send a less than 4 k amount for a last chunk.

If the address is a hit in the OSIT at 1011, then, at 1012, logic 160 sets that Command ID as in-progress in the MIDT. A timer is also set and is used for timing out if another packet is never received.

At 1013 it is determined whether the creq is a read command. If no, then from 1003 it was determined that the Command ID is not yet in progress, and so no buffer was yet designated to be used for this particular join operation. Consequently, at 1014 it is determined whether there is an available buffer (e.g., a FIFO) for the instant join. If not, then at 1015, the in-progress setting is reset in the MIDT and the process moves to 1040 where the MIDT is cleared and the CID is updated. At 1041, the data to be written is simply sent via the fabric 180 without any collation or joining.

If a buffer (FIFO) is available at 1014, then at 1016 the system will allocate a buffer with a predetermined buffer ID (BID), which will be updated in the MIDT.

At 1017, logic 160 writes a packet or information header, e.g., the host's address and the size of the packet, e.g., 4 k, for the packet to be sent over the fabric 180.

Data to be written is then stored in the buffer selected, and at 1019 logic 160 determines if the joining operation done. The joining operation may be determined as being complete or done based on the optimal size of the fabric packet to be sent learned from the OSIT. If no, in this case, then at 1022, logic 160 updates the SJIT with the next expected address.

If the incoming Creq command at 1001 was a read command, then at 1013 (and because this particular command ID is not in progress based on the flow from 1003, then at 1030 logic 160 determines if a virtual CID (VCID) is available. If not, then logic 160 proceeds to operations 1040 and 1041 as before. If a VCID is available, then at 1031, a VCID is allocated and the VCID and CID tables (FIGS. 8 and 9) are updated accordingly. If at 1033, the joining or coalescing of the, e.g., 16 read commands is complete, then at 1034 a read request can be sent over the fabric including the VCID, a starting address, and size. Such information can then be used when a response is received to split the data into, e.g., 256 byte chunks to be sent over the PCIe infrastructure. At 1035 a response timer is set to ensure that a response is eventually received, or the buffer allocated is freed up after a predetermined period of time.

Figure 11:
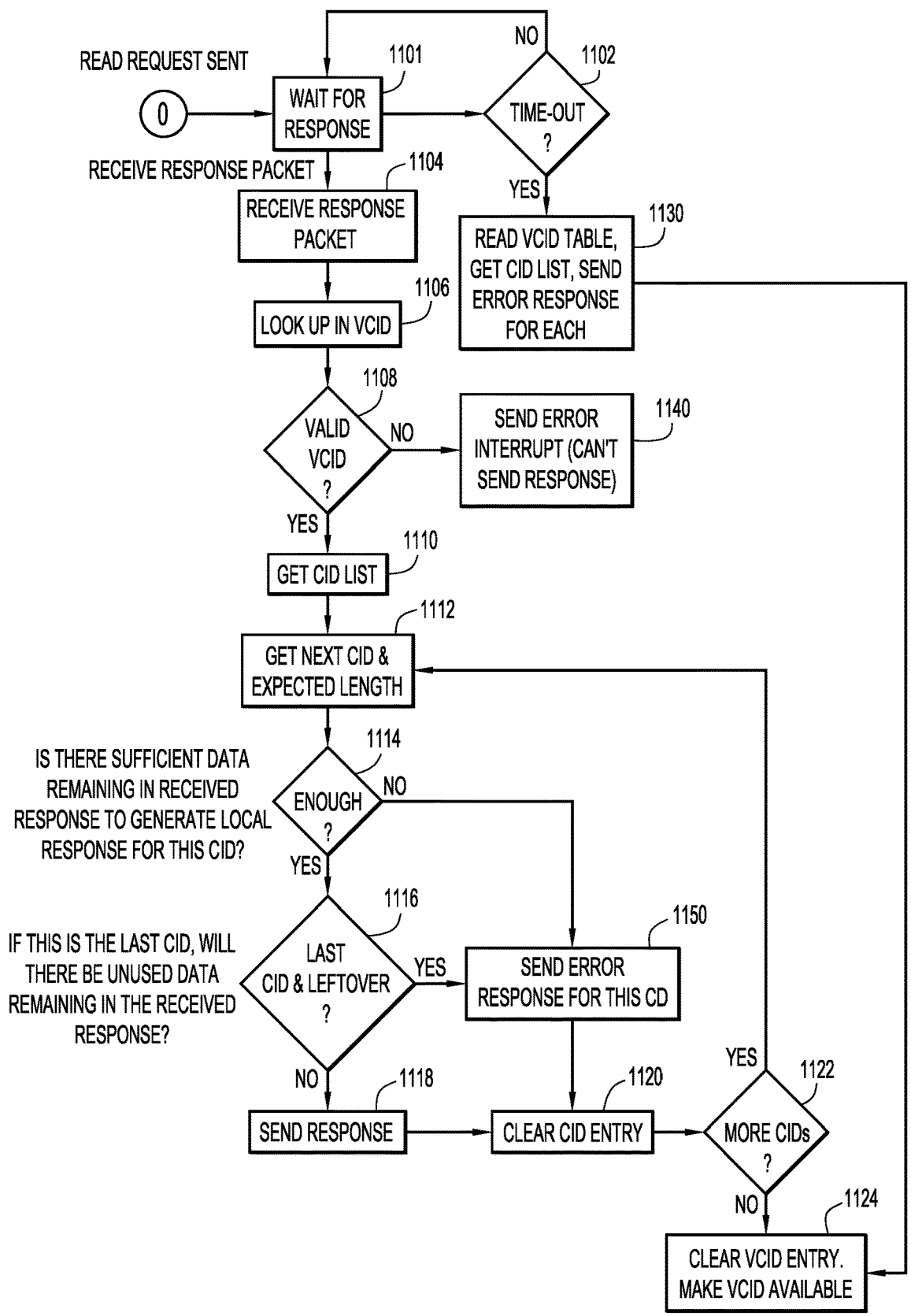
FIG. 11 is flow chart depicting a series of operations related to receiving a response to read command in accordance with an example embodiment.

FIG. 11 is flow chart depicting a series of operations related to receiving a response to read command in accordance with an example embodiment. After a read request (corresponding to a host NVMe write request) is sent, logic 160 waits for a response at 1101. At 1102 it is determined whether a timer, which was set previously (see FIG. 10, 1035), has expired or timed out. If not, logic 160 continues to wait for a response packet. At 1104, a response packet is received. At 1106, the VCID, which is part of the received response packet, is looked up in the VCID table (FIG. 9). Logic 160 then determines, at 1108, if the VCID is valid. If the VCID is not valid, then error interrupt is generated at 1140.

If at 1108 the VCID is deemed to be valid, then at 1110, logic 160 obtains the CID list from the VCID table, and from that information, at 1112, obtains the next CID and expected length.

At 1114 logic 160 determines whether there is sufficient data remaining in the received response to generate a local (e.g., PCIe side) response for the instant CID. If yes, then logic 160 determines at 1116 if there will be unused data remaining (leftovers) in the received response. If there will be no leftovers, then at 1118 the response for the instant CID is sent on the PCIe side. At 1120, the instant CID entry is cleared from the VCID table (FIG. 9) and at 1122 logic 160 determines if there are more CIDs to handle from the response. If yes, the flow returns to 1112. If there are no more CIDs to handle, then the VCID for the instant response is cleared from the VCID table (FIG. 9) so that that VCID can be used again.

If the determination is in the negative at either operations 1114 or 1116, logic 160 proceeds to 1150 where logic 160 sends an error response for the instant CID, and the process proceeds to 1120.

If, at 1102, the timer expired then at 1130 logic 160 reads the VCID table for the instant VCID, obtains the list of associated CIDs, and sends a response back into the PCIe infrastructure for each such CID. The process then continues with 1124.

Logic 160 may be in the form of software instructions, firmware instructions, or hard coded in the ASIC. In this regard, logic 160 may be stored on any one or on a combination of non-transitory computer readable storage media, such as in memory 420.

In summary, in one form, a method is provided. The method includes receiving a command request via a communication bus, the command request including a command ID; determining, based on the command identifier (ID), whether data in the command request is to be joined with data from other command requests having the same command ID; when it is determined, based on the command ID, that the data in the command request is to be joined with other data from other command requests having the same command ID, writing the data to a selected buffer in which the other data is already stored; and causing the data and the other data in the buffer to be sent as a payload of a single packet across a communications fabric.

The command request may be one of a write request including a payload or a read request.

The command ID may be part of an address field of the command request.

In the method, determining, based on the command ID, whether data in the command request is to be joined with data from other command requests includes determining whether an address received with the command ID is an expected next address in light of an address of data most recently written to the selected buffer and an amount of the data.

The method may further include receiving another command request including another command ID, and allocating a new selected buffer for data associated with the another command request.

The method may further include setting a timer associated with the command ID and, upon expiry thereof, enabling a reallocation of another selected buffer associated with the another command ID.

In an embodiment, a maximum data payload size of the command request is less than a maximum data payload size of the single packet to be sent across the communications fabric.

In an embodiment, the first command request is received via a Peripheral Component Interconnect Express (PCIe) interface, and the communications fabric is an Ethernet fabric.

In an embodiment, the command request is a read request, and a virtual command request ID is allocated to a plurality of the same command IDs associated with the read request and respective other read requests.

The method may still further include receiving another command request including another command ID, determining that data in the another command request is not to be joined with data from other command requests, and causing the data in the another command request to be sent as a payload of a single packet across a communications fabric.

In another form, a device may also be provided in accordance with an embodiment. The device may include an interface unit configured to enable network communications, a memory, and one or more processors coupled to the interface unit and the memory, and configured to: receive a command request via a communication bus, the command request including a command identifier (ID); determine, based on the command ID, whether data in the command request is to be joined with data from other command requests having the same command ID; when it is determined, based on the command ID, that the data in the command request is to be joined with other data from other command requests having the same command ID, write the data to a selected buffer in which the other data is already stored; and cause the data and the other data in the buffer to be sent as a payload of a single packet across a communications fabric.

The command request may be one of a write request including a payload or a read request.

The command ID may be part of an address field of the command request.

The one or more processors may further be configured to determine, based on the command ID, whether data in the command request is to be joined with data from other command requests by determining whether an address received with the command ID is an expected next address in light of an address of data most recently written to the selected buffer and an amount of the data.

The one or more processors may further be configured to receive another command request including another command ID, and allocate a new selected buffer for data associated with the another command request.

The one or more processors may further be configured to set a timer associated with the another command ID and, upon expiry thereof, enable a reallocation of another selected buffer associated with the another command ID.

In an embodiment, a maximum data payload size of the command request is less than a maximum data payload size of the single packet to be sent across the communications fabric.

In still another form, a non-transitory computer readable storage media is provided that is encoded with instructions that, when executed by a processor, cause the processor to perform operations including: receive a command request via a communication bus, the command request including a command identifier (ID); determine, based on the command ID, whether data in the command request is to be joined with data from other command requests having the same command ID; when it is determined, based on the command ID, that the data in the command request is to be joined with other data from other command requests having the same command ID, write the data to a selected buffer in which the other data is already stored; and cause the data and the other data in the buffer to be sent as a payload of a single packet across a communications fabric.

In an embodiment, the command request is one of a write request including a payload or a read request, and the command ID is part of an address field of the command request.

The above description is intended by way of example only. Various modifications and structural changes may be made therein without departing from the scope of the concepts described herein and within the scope and range of equivalents of the claims.

What is claimed is:

1. A method comprising
   receiving a command request via a communication bus, the command request including addresses in a scatter/gather list;
   modifying a portion of the addresses in the scatter/gather list to include a same command identifier (ID) that indicates that data associated with a same command ID is to be joined;
   writing the data associated with the same command ID to a selected buffer; and
   causing contents of the selected buffer to be sent as a payload of a single packet across a communications fabric.

2. The method of claim 1, wherein the command request is one of a write request in including a payload or a read request.

3. The method of claim 1, further comprising determining whether an address received with the command ID is an expected next address in light of an address of data most recently written to the selected buffer and an amount of the data.

4. The method of claim 1, further comprising receiving another command request, and allocating a new selected buffer for data associated with the another command request.

5. The method of claim 1, further comprising setting a timer associated with the command ID and, upon expiry thereof, enabling a reallocation of another selected buffer associated with the command ID.

6. The method of claim 1, wherein a maximum data payload size of the command request is less than a maximum data payload size of the single packet to be sent across the communications fabric.

7. The method of claim 6, wherein the command request is received via a Peripheral Component Interconnect Express (PCIe) interface, and the communications fabric is an Ethernet fabric.

8. The method of claim 1, further comprising receiving another command request, determining that data in the another command request is not to be joined with data from other command requests, and causing the data in the another command request to be sent as a payload of a single packet across the communications fabric.

9. A device comprising:
an interface unit configured to enable network communications;
a memory; and
one or more processors coupled to the interface unit and the memory, and configured to:
receive a command request via a communication bus, the command request including addresses in a scatter/gather list;
modify a portion of the addresses in the scatter/gather list to include a same command identifier (ID) that indicates that data associated with a same command ID is to be joined;
write the data associated with the same command ID to a selected buffer; and
cause contents of the selected buffer to be sent as a payload of a single packet across a communications fabric.

10. The device of claim 9, wherein the command request is one of a write request including a payload or a read request.

11. The device of claim 9, wherein the one or more processors are configured to determine whether an address received with the command ID is an expected next address in light of an address of data most recently written to the selected buffer and an amount of the data.

12. The device of claim 9, wherein the one or more processors are configured to receive another command request, and allocate a new selected buffer for data associated with the another command request.

13. The device of claim 9, wherein the one or more processors are configured to set a timer associated with the command ID and, upon expiry thereof, enable a reallocation of another selected buffer associated with the command ID.

14. The device of claim 9, wherein a maximum data payload size of the command request is less than a maximum data payload size of the single packet to be sent across the communications fabric.

15. A non-transitory computer readable storage media encoded with instructions that, when executed by a processor, cause the processor to:
receive a command request via a communication bus, the command request including addresses in a scatter/gather list;
modify a portion of the addresses in the scatter/gather list to include a same command identifier (ID) that indicates that data associated with a same command ID is to be joined;
write the data associated with the same command ID to a selected buffer; and
cause contents of the selected buffer to be sent as a payload of a single packet across a communications fabric.

16. The non-transitory computer readable storage media of claim 15, wherein the command request is one of a write request including a payload or a read request.

* * * * *